(12) United States Patent
Engstrom et al.

(10) Patent No.: US 7,738,857 B2
(45) Date of Patent: Jun. 15, 2010

(54) WIRELESS MOBILE PHONE WITH AUTHENTICATED MODE OF OPERATION INCLUDING PHOTO BASED AUTHENTICATION

(75) Inventors: G. Eric Engstrom, Kirkland, WA (US); Peter Zatloukal, Kirkland, WA (US)

(73) Assignee: Varia Holdings LLC, Brooklyn, NY (US)

( * ) Notice: Subject to any disclaimer, the term of this patent is extended or adjusted under 35 U.S.C. 154(b) by 384 days.

(21) Appl. No.: 10/550,926

(22) PCT Filed: Mar. 26, 2004

(86) PCT No.: PCT/US2004/009780

§ 371 (c)(1),
(2), (4) Date: Aug. 8, 2006

(87) PCT Pub. No.: WO2004/089010

PCT Pub. Date: Oct. 14, 2004

(65) Prior Publication Data

US 2007/0024698 A1    Feb. 1, 2007

Related U.S. Application Data

(60) Provisional application No. 60/457,801, filed on Mar. 28, 2003.

(51) Int. Cl.
H04M 1/66    (2006.01)

(52) U.S. Cl. ............ 455/411; 455/410; 455/556.1
(58) Field of Classification Search ............... None
See application file for complete search history.

(56) References Cited

U.S. PATENT DOCUMENTS

| | | | |
|---|---|---|---|
| 5,913,175 A | 6/1999 | Pinault | |
| 6,377,699 B1 * | 4/2002 | Musgrave et al. | 382/117 |
| 6,883,716 B1 * | 4/2005 | De Jong | 235/492 |
| 2002/0052192 A1 | 5/2002 | Yamazaki et al. | |
| 2002/0083329 A1 | 6/2002 | Kiyomoto | |
| 2003/0129964 A1 * | 7/2003 | Kohinata et al. | 455/411 |
| 2007/0090918 A1 * | 4/2007 | Engstrom et al. | 340/5.53 |

* cited by examiner

*Primary Examiner*—Erika A Gary
(74) *Attorney, Agent, or Firm*—Schwabe, Williamson & Wyatt P.C.

(57) ABSTRACT

A wireless mobile phone is equipped to operate in an unauthenticated and an authenticated mode of operation, depending on whether a user has been authenticated against an authentication reference. In one embodiment, the authentication is performed against an authentication reference retrieved from an identity card, and the wireless mobile phone includes a reader to retrieve the authentication reference from the identity card. In one embodiment, the authentication reference is photograph, and the wireless mobile phone includes a camera (132) to enable a photograph to be taken and be used for authentication. In one embodiment, the photograph is a photograph of the user.

9 Claims, 9 Drawing Sheets

WIRELESS MOBILE PHONE WITH AUTHENTICATED MODE OF OPERATION INCLUDING PHOTO BASED AUTHENTICATION

RELATED APPLICATION

The present invention claims priority to provisional application No. 60/457,801, filed Mar. 28, 2003, entitled "A Wireless Mobile Phone With Authenticated Mode Of Operation Including Photo Based Authentication", and incorporated in its entirety by reference.

FIELD OF THE INVENTION

The present invention relates to the field of wireless communication. More specifically, the present invention is related to a wireless mobile phone having an authenticated mode of operation available only to an authenticated user, in particular, a user authenticated via a photograph of the user's.

BACKGROUND OF THE INVENTION

Advances in microprocessor and telecommunication technology have led to wide spread deployment and adoption of mobile devices, such as wireless mobile phones. For wireless mobile phones, in addition to wireless telephony, the late models are often equipped with advanced capabilities, such as calendar, address book, access to the World Wide Web (WWW), emails, and so forth.

Much of these functionalities are designed to increase the productivity of business users. As a result, it is not surprising that business users constitute a major user segment of wireless mobile phones, especially for the high-end function rich models. Increasingly, more business data, such as business contact information, business plans, sales/marketing strategies, financial reports, and so forth, are being stored on wireless mobile phones.

However, unlike personal computers or other computing devices, where user authentication, through e.g. user log-in, are routinely provided with virtually all operating systems, few if any operating systems of wireless mobile phones provide means to authenticate users. As a result, under the prior art, wireless mobile phones are at risk of unauthorized usage, as well as data being compromised by unauthorized accesses.

Thus, it will be desirable if protection against unauthorized access of user data and/or usage of wireless mobile phones can be provided.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes, but not limit to, a wireless mobile phone having an authenticated mode of operation, available only to an authenticated user, in particular, a user authenticated by a photograph of the user.

Parts of the description will be presented in terms commonly employed by those skilled in the art to convey the substance of their work to others skilled in the art. The term "wireless mobile phone" as used herein (in the specification and in the claims) refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

The terms "photograph" and "photo" as used herein are synonymous, and are used interchangeably. Unless the context specifically delineates the "photograph" or "photo" to a particular manifestation, the terms are to include the physical manifestation of the photograph/photo, and/or the data structure/organization incarnation holding the data of the photograph/photo.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
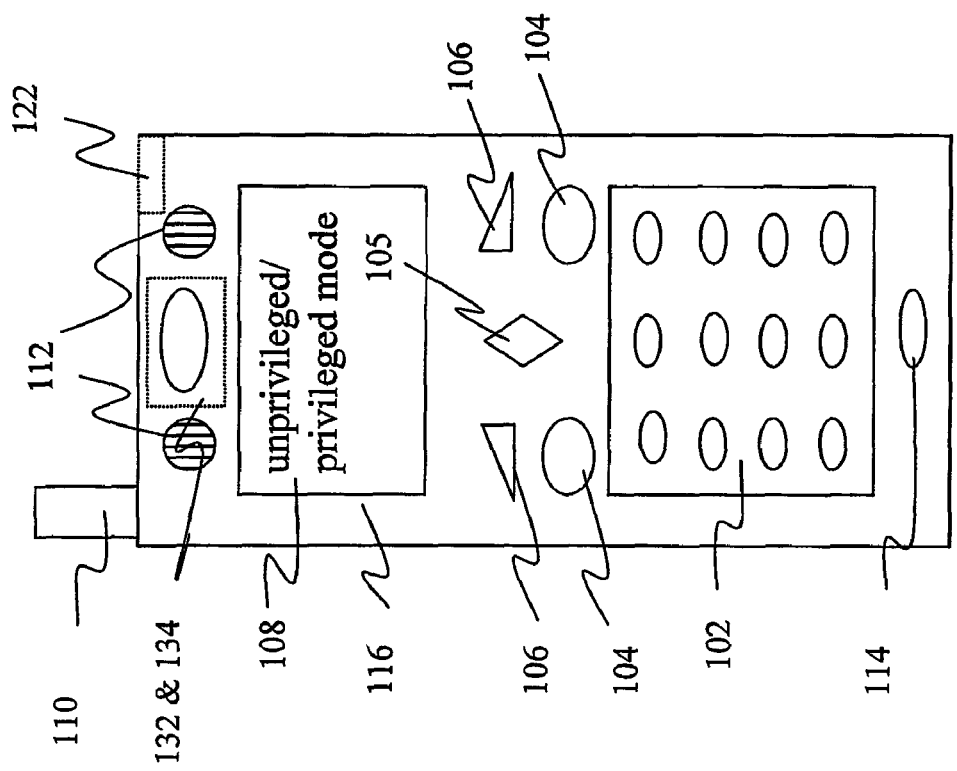
FIG. 1 illustrates a front view of a wireless mobile phone incorporated with the teachings of the present invention, in accordance with one embodiment.
Figure 2:
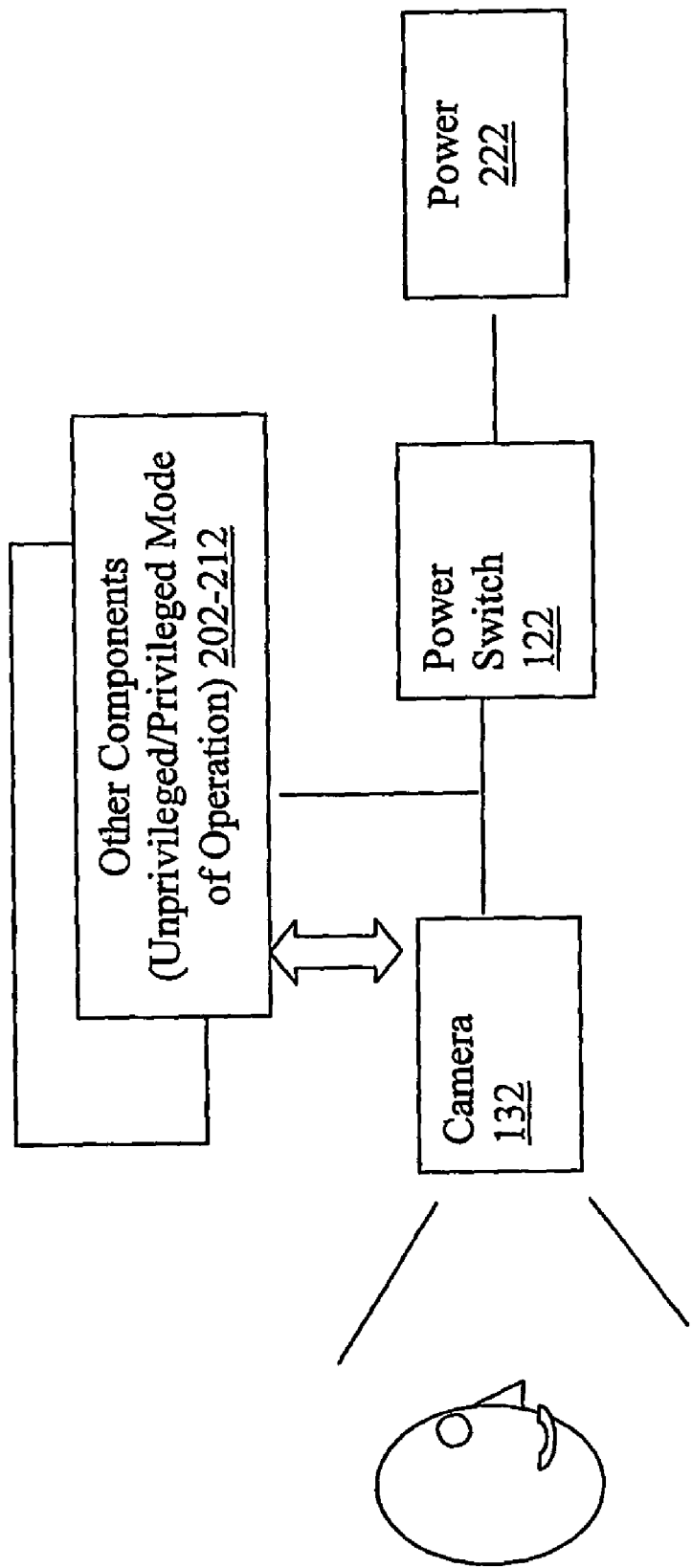
FIGS. 2-3 illustrate two architectural views of the wireless mobile phone of FIG. 1, in accordance with one embodiment.
Figure 3:
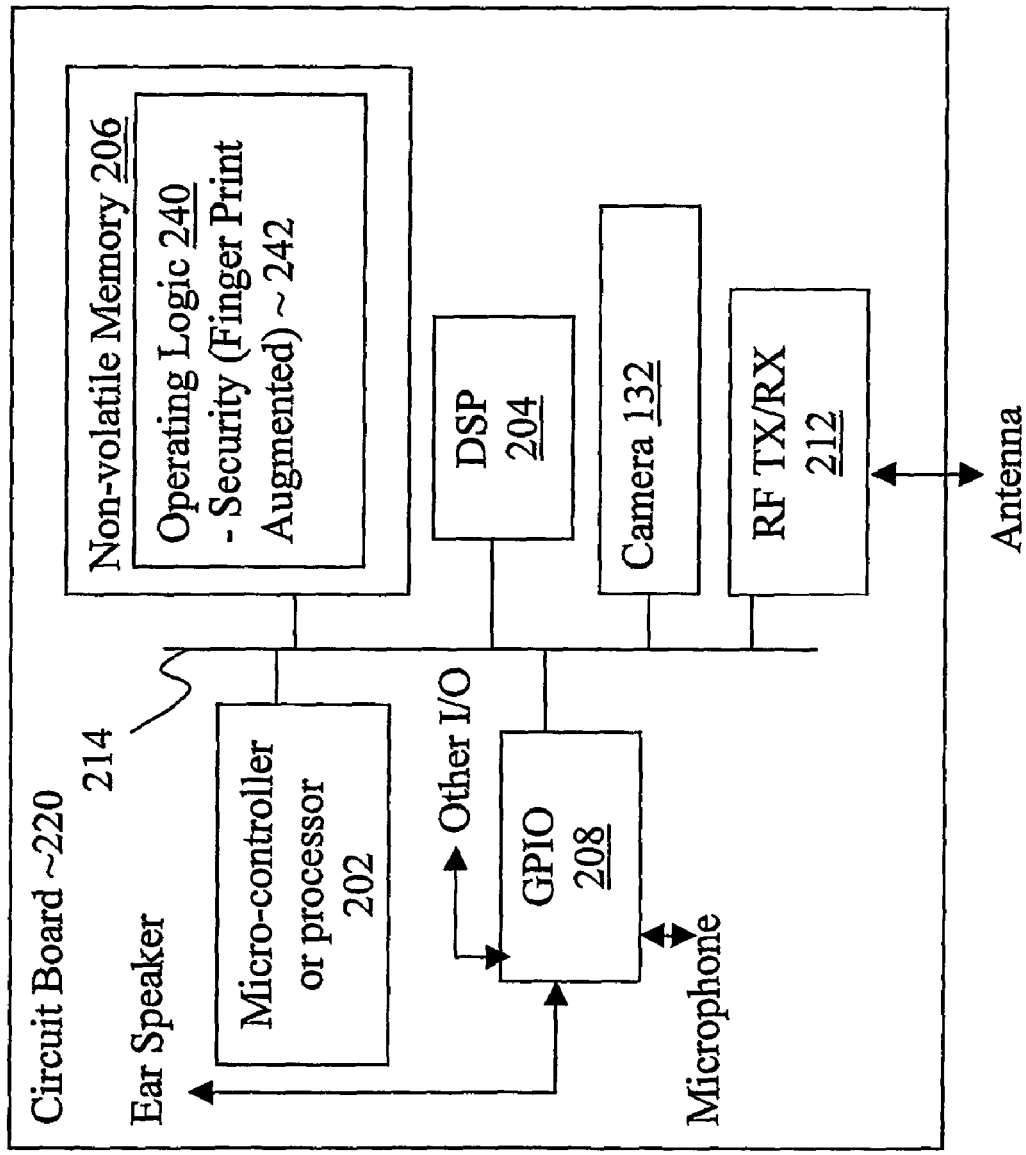

Referring now to FIGS. 1 and 3*a*-3*b*, wherein a front view and two architecture (internal component) views of a wireless mobile phone of the present invention, in accordance with one embodiment, are shown. As illustrated, wireless mobile phone 100 of the present invention (hereinafter, simply phone 100) is advantageously provided with operating logic 240 equipped in particular with security function 242, to operate phone 100 in at least an unauthenticated mode of operation and an authenticated mode of operation.

While operating in the unauthenticated mode of operation, i.e. without having the user authenticated, operating logic 240 makes available only a limited or reduced set of functions, whereas under the authenticated mode of operation, i.e. having the user authenticated, operating logic 240 makes available a more expanded or the entire set of functions.

The exact constitution of the limited/reduced set of functions and the expanded/full set of functions is application dependent, which may vary from embodiments to embodiments. In one embodiment, the limited/reduced set of functions include only the ability to make an emergency call, such as a 911 call, otherwise, no other functions, including but not limited to making other calls, accessing calendar, email, text messaging, viewing and/or storing documents, normal taking of pictures/photographs, and so forth, are permitted. These other functions are available only under the authenticated mode.

In another embodiment, the limited/reduced set of functions may effectively be a null function set, excluding even the ability to make an emergency call, except for notification of the unauthenticated status of the user, and perhaps, inviting the user to authenticate himself/herself, by e.g. allowing a photograph of the user to be captured in real time.

In various embodiments, in addition to the above described unauthenticated and authenticated modes of operation, operating logic 240 further supports a provisioning mode of operation, under which phone 100 is initially provisioned. Under the initial provisioning mode, conventional provisioning, such as configuring phone 100 for a particular wireless carrier, a particular subscriber and so forth, may be performed. Entry into the initial provisioning mode may be effectuated in any one of a number of conventional approaches.

Continue to refer to FIGS. 1 and 3a-3b, for the illustrated embodiment, phone 100 is further advantageously equipped with camera 132 (including lens 134) to facilitate taking of photographs (while operating in the authenticated mode). However, in addition to its conventional use for taking photographs, operating logic 240, or more specifically, security function 242, is endowed to authenticate a user through a photograph of the user (prior to operating phone 100 in the authenticated mode).

In particular, as will be described in more detail below, operating logic 240, in general, is equipped to establish a reference photograph of a user for authentication purpose, and automatically invokes camera 132 to capture a photograph of the user real time, during power on or reset. Further, security function 242 is endowed to use the reference and the real time captured photographs of the user to authenticate the user, and determine whether to continue to operate phone 100 in an unauthenticated mode, or operate phone 100 in an authenticated mode.

In other words, under the present invention, operating logic 240 operates phone 100 in the authenticated mode, and makes available the expanded/full set of functionalities, only if the user has been authenticated by his/her photo, otherwise, phone 100 is operated in the unauthenticated mode with only a limited/reduced set of functionalities (except in the initial provisioning mode).

For the embodiment, operating logic 240, more specifically, security function 242, also supports the taking of a photograph of the user, and its saving as a reference for subsequent analysis of a taken photograph to authenticate a user, before operating phone 100 in the authenticated mode.

In various embodiments, the saving of the reference photograph is also supported under a special configuration mode, while operating in the authenticated mode. Entry into the configuration mode (while operating in the authenticated mode) may also be effectuated in any one of a number of conventional means.

Continuing to refer to FIGS. 1 and 3a-3b, additionally, phone 100 includes conventional wireless telephony elements, including power switch 122, power 222, audio communication elements, such as ear speaker 112 and microphone 114, and non-audio communication elements, such as input key pad 102 having a number of alphanumeric input keys and display 108. Further, the non-audio input elements may further include scroll button 105, selection buttons 106, and "talk" and "end talk" buttons 104. These elements are disposed on various external surfaces of body 116.

As illustrated in FIG. 3a, upon depression by a user (optionally, for a predetermined duration), while phone 100 is in a powered down or lower power state, power switch 122 couples power 222 to camera 132 and other components 202-212. Likewise, upon depression by a user (optionally, for a predetermined duration), while phone 100 is in powered up state, power switch 122 cuts off or reduces power 222 to all or selected ones of camera 132 and other components 202-212.

Externally, phone 100 may also include antenna 110. Keys of key pad 102 may be surrounded by, or otherwise include illuminable light emitting diodes (LED) in their backgrounds. For the purpose of the present specification, the terms "button" and "key" may be considered synonymous, unless the context clearly indicates otherwise.

Internally, in addition to processor 202 and DSP 204, phone 100 also includes non-volatile memory 206, general purpose input/output (GPIO) interface 208, and transmit/receive (TX/RX) 212, coupled to each other, processor 202 and DSP 204, via bus 214, and disposed on a circuit board 220.

Except for the novel manner that many of these elements, such as processor 202, DSP 204 and so forth, are used in support of making the expanded/full set of functionalities available only to an authenticated user, the enumerated elements otherwise perform their conventional functions known in the art.

Non-volatile memory 206 is employed to store programming instructions and optionally, working data, including operating logic 240 and its security function 242. Working data may include callee/messaging party or parties (e.g. their phone numbers or IP addresses) with whom user may communicate. Working data may include the reference and input photographs of the user.

Processor 202, assisted by DSP 204, is employed to operate phone 100, executing operating logic 240, including security function 242.

Keys of key pad 102 may be employed to enter alphanumeric data, including entering a sequence of alphanumeric data for the phone number or address of a "callee". Selected sequence of the keys (such as "*#") may also be employed to denote a user instruction to return to the unauthenticated mode of operation, if entered while operating in the authenticated mode of operation, or to return to the authenticated mode of operation, if entered while operating in the unauthenticated mode of operation (provided the user is authenticated).

Scroll key 105 and companion selection keys 106 may be employed to scroll and select various options or list items of various menu options or selection lists, including scrolling and selecting list items presented for user interactions to verify the user's wellness. For the embodiment, scroll key 105 may be selected in one of two positions, an "up" position or a "down" position for scrolling a selection list in an "up" direction and a "down" direction respectively. Similarly, scroll and selection keys 105/106 may also be employed to select a menu item to convey a user instruction to return to the unauthenticated mode, if the selection is made while operating in the authenticated mode, or to return to the authenticated mode, if the selection is made while operating in the unauthenticated mode (provided the user is authenticated).

GPIO 208 may be employed to generate input signals, such as a corresponding "alphanumeric" signal in response to a user selection of one of the keys of key pad 102, a "scroll" signal" (or more specifically, a "scroll up" or a "scroll down" signals) in response to a user selection of scroll key 105, a "selection" signal in response to a user selection of select button 106, and so forth.

TX/RX 212 may be employed to transmit and receive communication signals for a call and/or a text message. TX/RX 212 may be a radio frequency transceiver, and support one or more of any of the known signaling protocols, including but are not limited to CDMA, TDMA, GSM, and so forth.

The constitutions of these elements are known, and will not be further described.

As to operating logic 240, including security function 242, it may be implemented in the assembly or machine instructions of processor 202, or a high level language that can be compiled into these assembly or machine languages. In alternate embodiments, all or portions of operating logic 240, including security function 242 may be implemented in firmware and/or hardware.

Accordingly, except for the enhancements provided, phone 100 otherwise represents a broad range of wireless mobile phones, including both the analog as well as the digital types (of all signaling protocols), substantially rectangular uni-body as illustrated, or curved uni-body, as well as multi-portions, such as "flip phones" to be illustrated later.

Figure 4A:
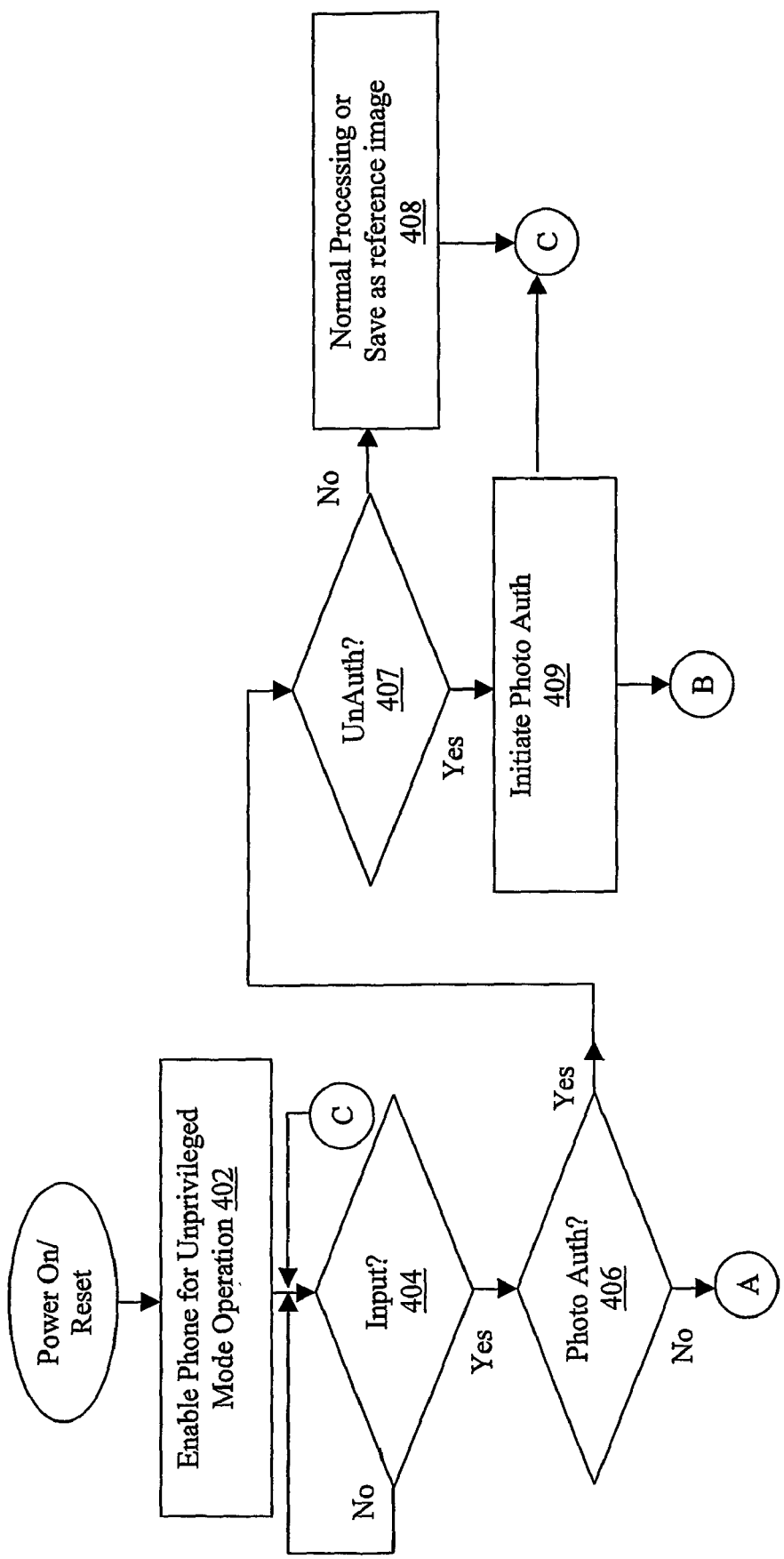
FIGS. 4*a*-4*b* illustrate the operational flow of the relevant aspects of the operating logic of FIG. 3, in accordance with one embodiment.
Figure 4B:
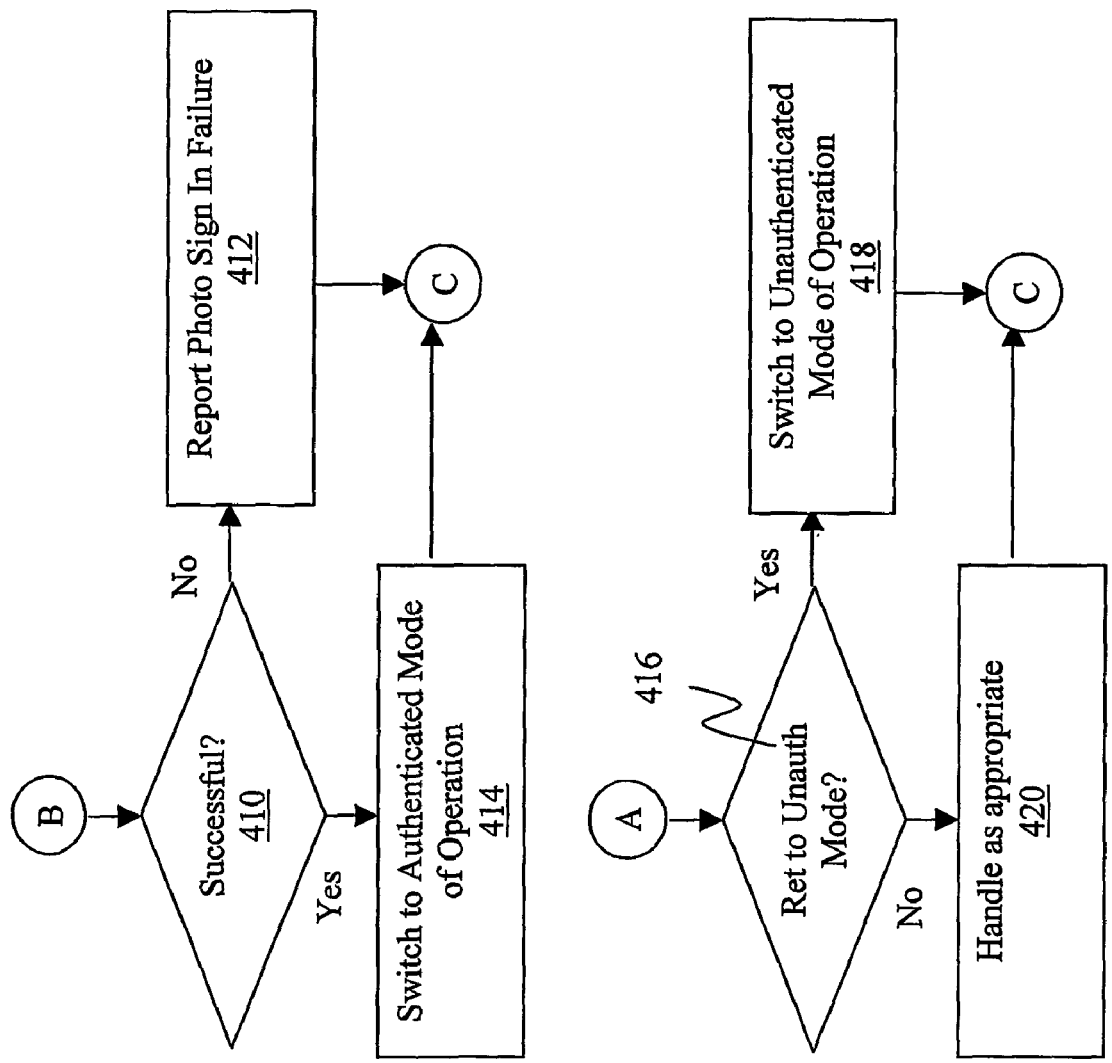

FIG. 4 illustrates the operational flow of the relevant aspects of operating logic 240, in accordance with one embodiment. As illustrated, on start up/reset (such as depression of power on/off button 122 for the required predetermined duration by a user), operating logic 240 enables phone 100 to operate in the earlier described unauthenticated mode, making available only a limited/reduced set of functionalities, block 402. Thereafter, operating logic 240 waits for additional user input, block 404.

Recall from earlier description, upon depression by a user, while phone 100 is in powered down or low power state, power switch 122 couples power to camera 122 and other components 202-212 of phone 100. For the embodiment, on power on/reset, operating logic 230 causes camera 132 to automatically take a photograph of the objects in view. Resultantly, a photograph of an authorized user who is aware of the authentication requirement, and have properly position his/her face in front of the camera, would have a photograph of the user taken or captured in real time, for authentication.

Accordingly, under the present invention, photograph based authentication is seamless integrated with the power on/reset process.

While typically, the authentication process employs photographs that are front views of a user's face, in alternate embodiments, the present invention may be practiced with the authentication process employing photographs that are side views of a user's face, or other views. Further, the present invention may be practiced with authenticating against any arbitrary photograph, a photograph of the user's hand, feet, a ring, a watch, a spouse or child's picture, and so forth. The random selection of articles/objects, in particular, an article/object that is "unique", and is almost always in possession by the user only, may be just as secure as authenticating against a photograph of the user's face.

Continuing to refer to FIG. 4, on receipt of inputs, operating logic 240 determines if the input is a photograph captured by camera 132 in real time (more specifically, by DSP 204, after it processes the signals output by camera 132 into a photograph), block 406.

If the user input is photograph, operating logic 240 (or more specifically, security function 242) further determines if phone 100 is operating in the unauthenticated mode, within the authenticated mode (including whether it is within the configuration mode of the authenticated mode), or the initial provisioning mode, block 407.

If phone 100 is determined to be operating in the authenticated mode, the processing is turned over to a camera function (not shown), which handles the photograph in an application dependent manner, block 408. In other words, the user is using camera 132 for its primary purpose, taking photographs/pictures for the user.

If phone 100 is determined to be operating in the configuration mode within the authenticated mode, or the initial provisioning mode, operating logic 240 (or more specifically, security function 242) saves the captured photograph as a reference photograph for future user authentication, block 408.

If phone 100 is determined to be operating in the unauthenticated mode, operating logic 240 (or more specifically, security function 242) initiates the photograph based authentication process, authenticating the user by comparing the real time captured photograph, against the previously saved reference photograph, block 409.

If the photograph does not substantially match the previously saved reference photograph, block 410, operating logic 240 (or more specifically, security function 242) reports the authentication failure, block 412, and continues to operate phone 100 in the unauthenticated mode at block 404.

However, if the inputted photograph substantially matches the previously saved reference photograph, block 410, operating logic 240 (or more specifically, security function 242) enables phone 100 to operate in the authenticated mode, block 414. Thereafter, operating logic 240 continues operation at block 404.

The precision level at which a real time captured photograph is to be considered substantially matching with a reference photograph is application dependent. Preferably, different user selectable precision levels are offered. As with other user selectable options, the selection may be facilitated in any one of a number of known user selection techniques.

Back at block 408, if the input is determined not to be photograph input, operating logic 240 determines if the input is a user instruction to return to the unauthenticated mode of operation (e.g. a user selecting or inputting such command using alphanumeric keys 102 and/or scroll/select keys 105 and 106 while operating in an authenticated mode of operation), block 416.

If the input is determined to be a user instruction to return to the unauthenticated mode of operation, operating logic 240 (or more specifically, security function 242) returns phone 100 to operate in the unauthenticated mode, block 418. Thereafter, operating logic 240 continues operation at block 404.

In one embodiment, before exiting to the unauthenticated mode, operating logic 240 (or more specifically, security function 242) causes a user selectable "resume" (i.e. re-authentication) option to be rendered on display 108. Selection of the option is processed as if phone 100 is being powered on or reset. That is, operating logic 240 automatically causes camera 132 to capture another photograph of the objects in view for authentication purpose.

If the input is determined to be other user inputs, operating logic 240 handles the other user inputs in an application dependent manner, block 420. In particular, if the input is a user instruction to return to the authenticated mode of operation, operating logic 240 continues operation at block 404, and awaits for another photograph input to re-authenticate the user. If the input is other conventional inputs, the inputs are processed as in the prior art. Thereafter, operating logic 240 continues operation at block 404.

Figure 5:
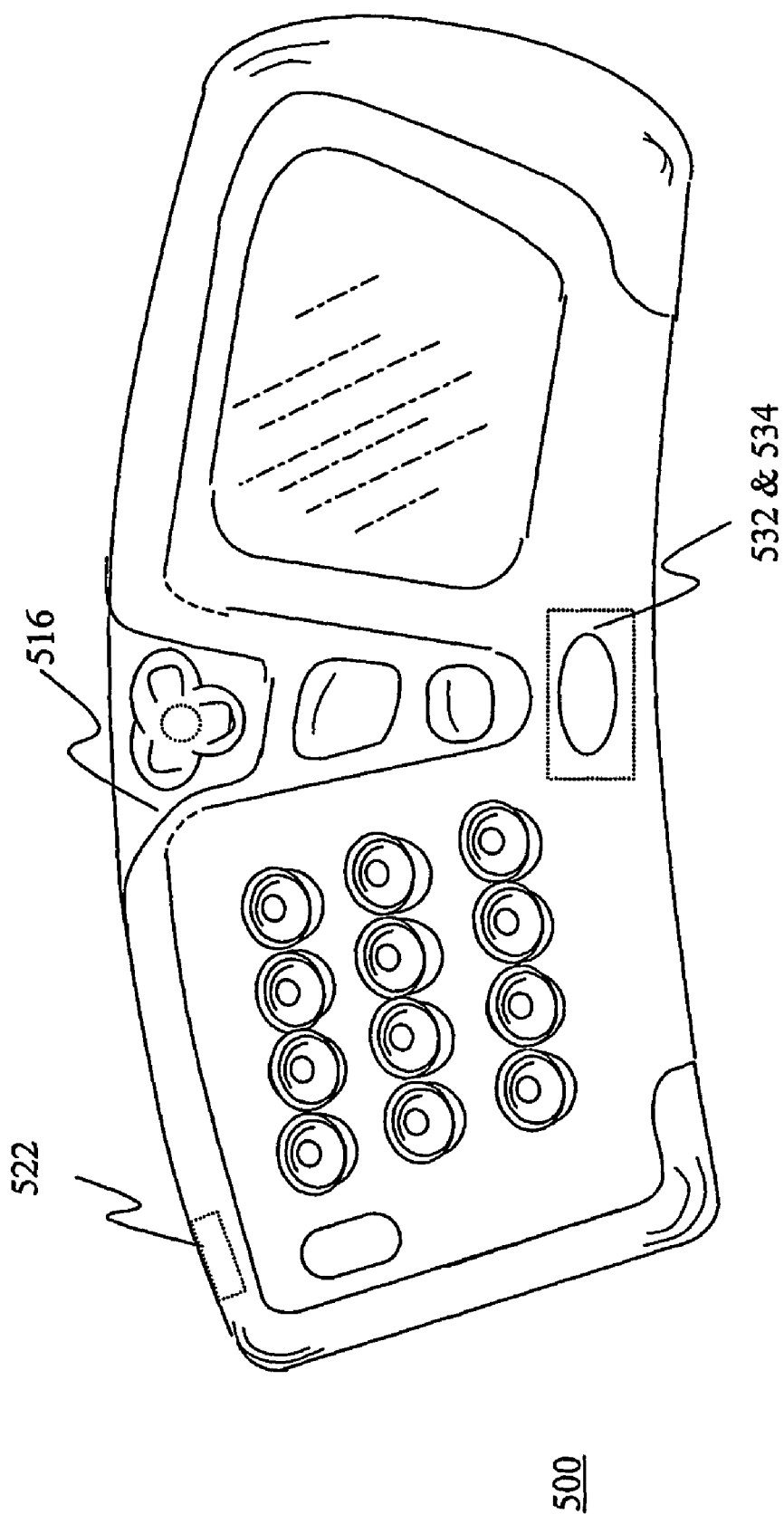
FIG. 5 illustrates a front view of another wireless mobile phone incorporated with the teachings of the present invention, in accordance with an alternate embodiment.

FIG. 5 illustrates another embodiment of the wireless mobile phone of the present invention. More specifically, FIG. 5 illustrates a front view of the alternate embodiment. The alternate embodiment is substantially that of the embodiment of FIG. 1, except that phone 100 is substantially rectangular in shape, whereas phone 500 has a curved shape. Also, camera 532 is disposed at a side of the front surface of body 516 of phone 500 instead.

Figures 6A, 6B:
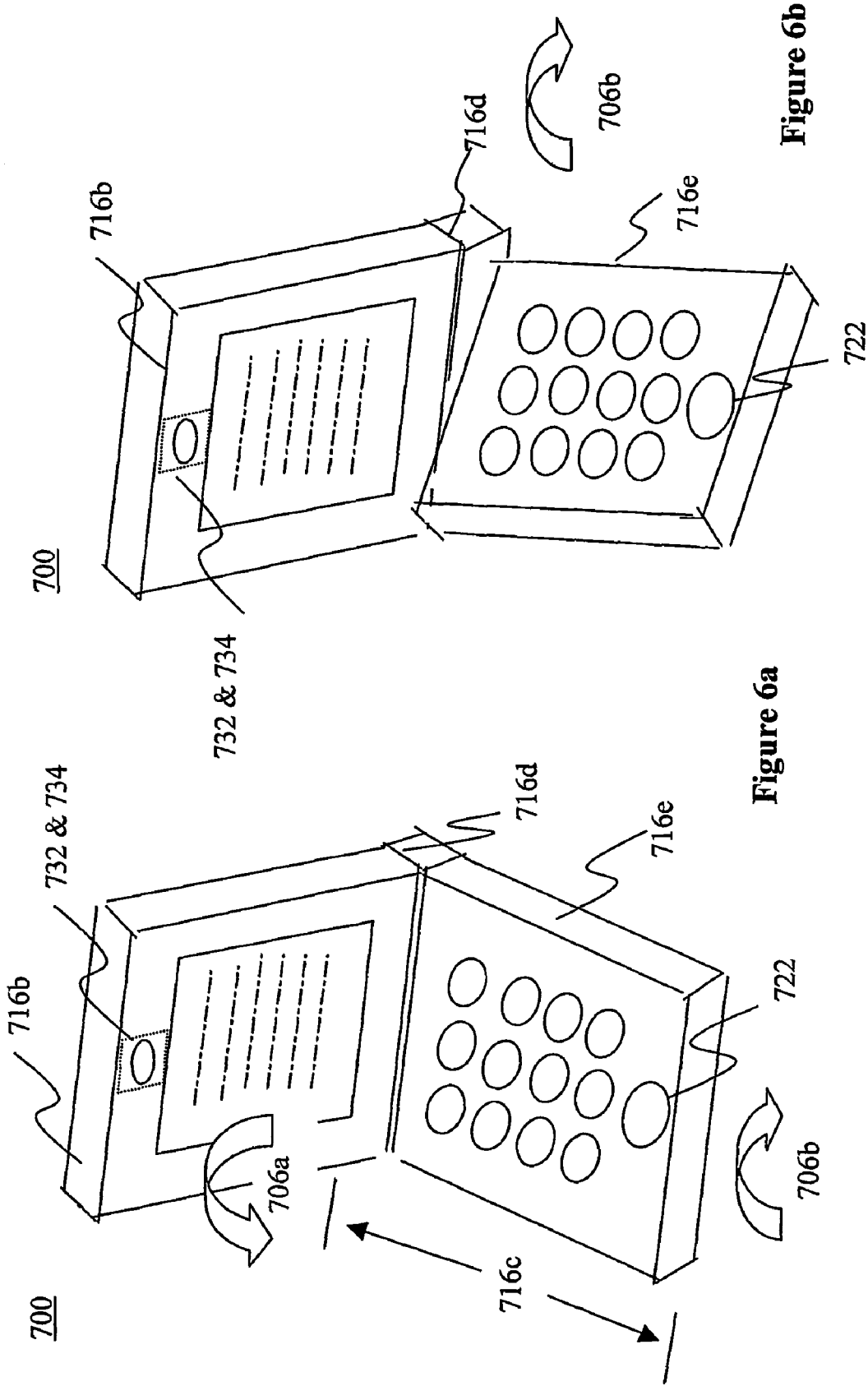
FIGS. 6*a*-6*b* illustrate two perspective views of another wireless mobile phone incorporated with the teachings of the present invention, in accordance with yet another embodiment.

FIGS. 6a-6b illustrate yet another embodiment of the wireless mobile phone of the present invention. More specifically, FIG. 6a-6b illustrate two perspective views of the embodiment. The embodiment is also substantially that of the embodiments of FIGS. 1 and 5, except that phone 100 is substantially rectangular, phone 500 has a curve shaped body, whereas phone 700 has a multi-section body. The multi-section form factor includes a first section 716b and a second section 716c, and the second section 716c is further comprised of at least two sub-sections 716d-716e. The first and second sections 716b-716c may pivot towards each other as denoted by direction arrow 706a or away from each other opposite to the direction denoted by arrow 706a. Sub-section 716d may rotate relative to sub-section 716e as denoted by the directions denoted by arrows 706b. In other words, phone 700 may be considered as an improved version of what is commonly referred to as "flip" phones.

Similar to the earlier described embodiments, phone 700 is provided with operating logic having a security function as earlier described, and camera 732. Except, camera 732 is disposed at a front surface of upper section 716b of phone 700 instead.

In alternate embodiments, second section 716c may be a uni-section, i.e. it is not further sub-divided into to relatively pivotable sub-sections.

In yet other embodiments, the reference photograph may be provided to the wireless mobile phone in a secure manner, e.g. read from an identity card, via an identity card reader additionally provided to the wireless mobile phone.

Figure 7B:
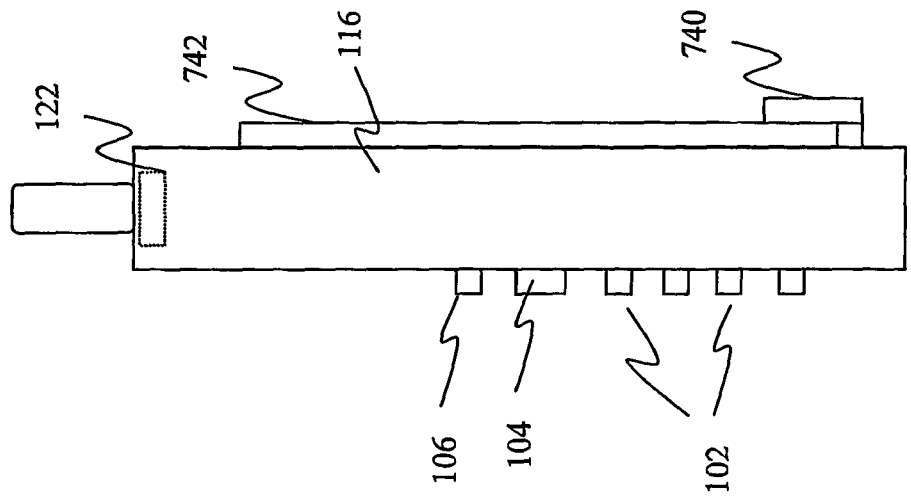
FIGS. 7*a*-7*b* illustrate a front view and a side view of another wireless mobile incorporated with another aspect of the teachings of the present invention, in accordance with yet another embodiment.
Figure 7A:
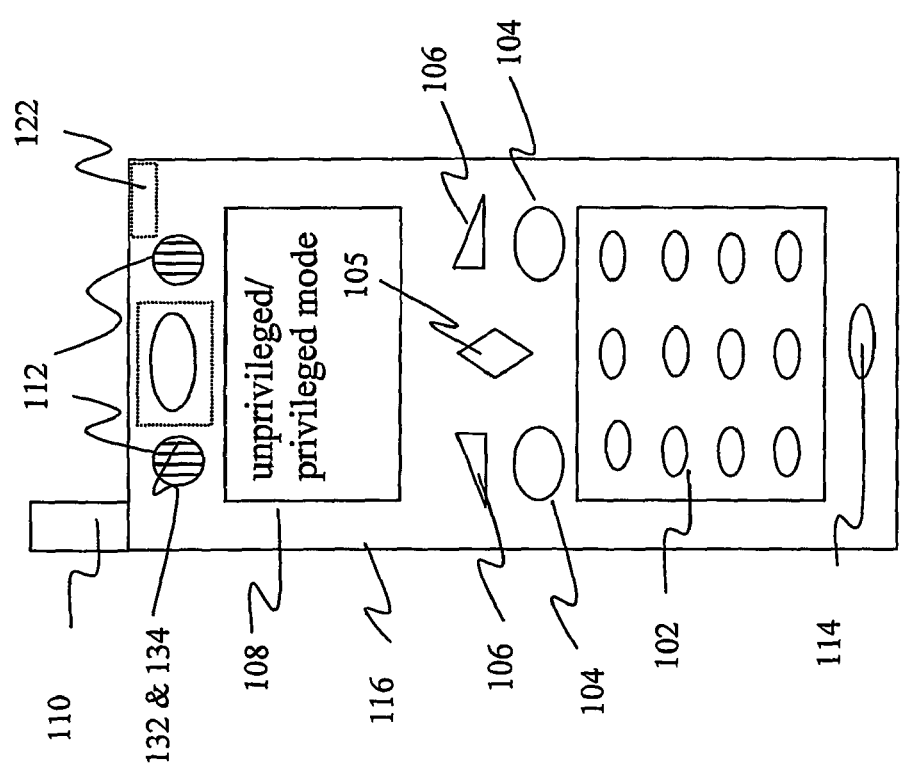

FIGS. 7a-7b illustrate one such embodiment. As illustrated in FIG. 7b, wireless mobile phone 100 is additional endowed with an identity card reader 740. Identity card reader 740 (optionally, assisted by a device driver additionally provided to supplement operating logic 240) is equipped to retrieve the earlier described reference photograph from identity card 742.

Preferably, identify card 742 has a form factor that is difficult to forge, and its issuance is governed by a secured process. Resultantly, security for wireless mobile phone 100 is further enhanced.

Figure 8B:
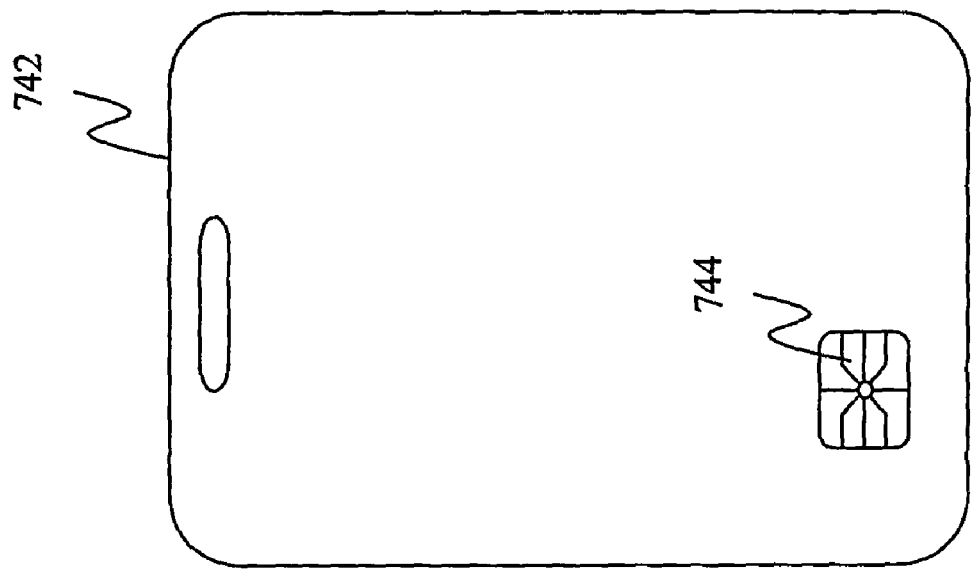
FIGS. 8*a*-8*b* illustrate a front view and a back view of the identity card of FIG. 7*b* in further detail, in accordance with one embodiment.
Figure 8A:
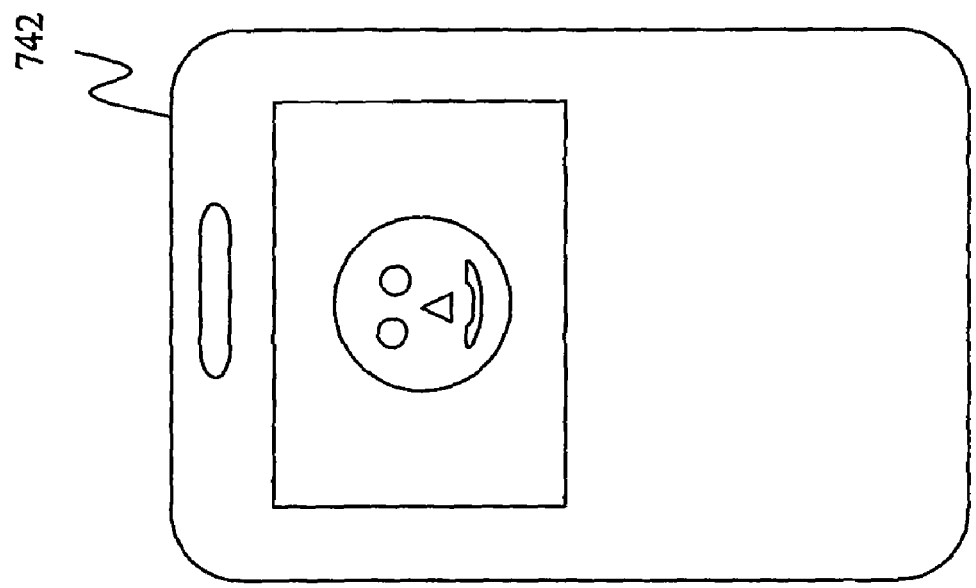

For the embodiment, identity card 742 comprises a smart electronic card 744 (commonly referred to as a smart card) (see FIG. 8a-8b), and the reference photograph is pre-stored in the embedded smart card 744. Operating logic 240 (optionally, supplemented by a corresponding reader device driver) retrieves the reference photograph from embedded smart card 744, on detection of the presence of identity card 742.

In various embodiments, the reference photograph may be further protected via encryption, requiring operating logic 240 to posses the proper decryption key to recover the reference photograph after retrieval.

In yet other embodiments, the reference photograph may be further protected via an authentication protocol, requiring wireless mobile phone 100 to be equipped with the appropriate credential to authenticate itself to smart card 744, before being allowed by smart card 744 to access the pre-stored reference photograph in smart card 744.

In yet other embodiments, the reference photograph may be imprinted on identity card 742, and identity card reader 720 is an optical reader.

In yet still other embodiments, the reference photograph may be encoded via a magnetic strip disposed on a surface of identity card 742, and identity card reader 720 is a magnetic code reader.

These are just a few example, other equivalent encoding/storing and reading/retrieving techniques may also be employed instead.

CONCLUSION AND EPILOGUE

Thus, it can be seen from the above descriptions, a novel wireless mobile phone that can afford protection against unauthorized access to user data and/or usage of the phone has been described.

While the present invention has been described in terms of the foregoing embodiments, those skilled in the art will recognize that the invention is not limited to the embodiments described. The present invention can be practiced with modification and alteration within the spirit and scope of the appended claims.

In particular, the present invention may be practiced with employing additional and/or other means to authenticate a user.

Thus, the description is to be regarded as illustrative instead of restrictive on the present invention.

What is claimed is:

1. An apparatus comprising:
  a plurality of components including a component to store a reference photograph, wherein the reference photograph is a photograph depicting an article;
  a camera; and
  operating logic configured to operate the components and the camera in a selected one of a first mode and a second mode based on authentication of the user, the operating logic further configured to
    activate the camera to automatically take a first photograph in response to power-on or reset,
    compare the first photograph to the stored reference photograph to authenticate the user,
    determine whether the user is successfully authenticated based at least in part on said comparison of the first photograph to the reference photograph,
    operate the components and the camera in the first mode, in response to successful authentication of the user, to allow a first set of functions to be made available, the first set of functions including operation of said camera to take a second photograph, and
    operate the components and the camera in the second mode, in response to unsuccessful authentication of the user, to allow a second set of functions to be made available, the second set of functions including fewer functions than the first set of functions.

2. The apparatus of claim 1, further comprising a reader to facilitate provision of the reference photograph to the apparatus, for use to authenticate the user.

3. The apparatus of claim 2, wherein the reader is an electronic reader, an optical reader or a magnetic reader.

4. A method, comprising:
  an apparatus automatically activating a camera of the apparatus, in response to power-on, to take a photograph;
  the apparatus authenticating a user by comparing the automatically taken photograph to a saved reference photograph wherein the reference photograph is a photograph depicting a non-anatomical object;
  the apparatus determining whether the user was successfully authenticated or unsuccessfully authenticated based at least in part on the comparing;
  operating a first set of components of the apparatus in a first mode in response to successful authentication of the user, said operating including operating the camera in the first mode to take an additional photograph; and
  operating a second set of components of the apparatus in a second mode in response to unsuccessful authentication of the user, power-on, and reset, said second set of components offering fewer functions than the functions offered by the first set of components.

5. The method of claim 4, wherein the method further comprises the apparatus saving the reference photograph.

6. The method of claim 5, wherein the method further comprises the apparatus retrieving the reference photograph from a source external to the apparatus.

7. The method of claim 6, wherein said retrieving comprises the apparatus performing a retrieving operation selected from the retrieving operation group consisting of an electronic retrieval operation, an optical retrieval operation, and a magnetic retrieval operation.

8. A wireless mobile phone comprising:
  a camera operable in a first mode and in a second mode;
  a plurality of components coupled to each other to facilitate wireless telephony communication by a user, with the components being equipped to operate in at least a selected one of the first mode and the second mode, the components including a component to store a reference photograph wherein the reference photograph is a photograph depicting an article or a photograph depicting a non-anatomical object; and
  operating logic to automatically activate the camera, in response to power-on, to take a photograph, to compare the taken photograph to the reference photograph to authenticate a user, to operate the components in said first mode after successful authentication of the user, said first mode allowing access of the user to a first set of functions, the first set of functions including operation of the camera to take an additional photograph, and to operate the components in said second mode if the user is not successfully authenticated, said second mode allowing access of the user to a second set of functions, the second set of functions being a smaller function set than the first set of functions.

9. In a wireless mobile phone, a method of operation comprising:
  automatically activating a camera of the wireless mobile phone, in response to power-on, to capture a photograph;
  authenticating a user by comparing the captured photograph to a stored reference photograph, wherein the reference photograph is a photograph of a manufactured article or a photograph depicting a non-anatomical object;
  operating a plurality of components of the wireless mobile phone to facilitate wireless telephony communication by a user, in a first mode, if the user is not authenticated the plurality of components being operated in the first mode in response to power-on and in response to reset; and
  operating the components in a second mode if the user is successfully authenticated, the second mode offering more functions to the user than the first mode, wherein the camera is operable in the second mode to capture an additional photograph.

* * * * *

UNITED STATES PATENT AND TRADEMARK OFFICE
CERTIFICATE OF CORRECTION

| | | |
|---|---|---|
| PATENT NO. | : 7,738,857 B2 | Page 1 of 1 |
| APPLICATION NO. | : 10/550926 | |
| DATED | : June 15, 2010 | |
| INVENTOR(S) | : Engstrom et al. | |

It is certified that error appears in the above-identified patent and that said Letters Patent is hereby corrected as shown below:

That portion of column 10, line 30 which reads "if the user is not authenticated" should read
-- if the user is not authenticated, --

Signed and Sealed this
Eighth Day of March, 2011

David J. Kappos
*Director of the United States Patent and Trademark Office*